United States Patent [19]
Messing

[11] 4,064,323
[45] Dec. 20, 1977

[54] BATTERY HAVING VENTING WRAPPER COMPRISING GAS PREVIOUS PLASTIC LAYER AND FRACTURED GAS IMPERVIOUS LAYER

[75] Inventor: Terry Glen Messing, Verona, Wis.
[73] Assignee: ESB Incorporated, Philadelphia, Pa.
[21] Appl. No.: 735,582
[22] Filed: Oct. 26, 1976
[51] Int. Cl.² ............................................ H01M 2/12
[52] U.S. Cl. ..................................... 429/86; 29/623.1
[58] Field of Search .................................. 429/86, 82

[56] References Cited

U.S. PATENT DOCUMENTS

| 2,478,798 | 8/1949 | Williams | 429/56 |
| 2,693,499 | 11/1954 | Neumann | 429/86 |
| 2,729,693 | 1/1956 | Waber | 429/86 |
| 3,870,566 | 3/1975 | Bergum et al. | 429/162 |

Primary Examiner—Donald L. Walton
Attorney, Agent, or Firm—Raymond L. Balfour

[57] ABSTRACT

A battery is at least partially enclosed by a wrapper comprising a composite of a gas pervious plastic layer and a gas impervious layer. The gas impervious layer has a fracture wide enough to permit the transmission of gases, and the width of the fracture can be maintained at a predetermined and desired size. The combination of the gas pervious plastic layer and the fracture in the gas impervious layer provides a system for regulating the species of gases that enter and/or exit from the battery, as well as the rate at which such gas transmissions occur. The gas impervious layer may be a thin metal foil, preferably of aluminum.

9 Claims, 10 Drawing Figures

A

B

C

D

BATTERY HAVING VENTING WRAPPER COMPRISING GAS PREVIOUS PLASTIC LAYER AND FRACTURED GAS IMPERVIOUS LAYER

Background of the Invention

A variety of venting systems have previously been designed for regulating the species of gases that enter and/or exit from a battery, as well as the rate at which such gas transmissions occur. Frequently these systems are designed to permit the passage of gases while preventing the passage of liquids or vapors. A gas pervious layer of plastic or other material is often used as the device, or an element in a system, used for such purposes.

Components or laminations of a gas impervious layer such as a metal foil and a gas pervious layer such as a plastic member have been used, among other reasons, to prevent the loss of liquids from flat, thin dry cell batteries; see U.S. Pat. No. 3,741,814. In a modification of that system illustrated in U.S. Pat. No. 3,853,629, a portion of the interface between the metal foil and gas pervious layer has been left unlaminated, the unlaminated portion providing a passageway between the two materials for the venting of gases that had been generated inside the battery and passed through the gas pervious layer. In neither of the constructions shown in these two patents could the gases go through the metal foil after having passed through the gas pervious layer, however.

Combinations of a gas pervious layer and a metallic member having a hole therein, used for the purpose of permitting the passage of gases while preventing the passage of liquids from a battery, are shown in U.S. Pat. Nos. 3,741,812, 3,741,813 and 3,899,355. In those constructions, however, the holes in the metal are so large that their size is not a factor which significantly influences the rate of gas transmission between the interior and the exterior of the battery.

Constructions in which the holes are much smaller are shown in U.S. Pat. Nos. 3,901,732 and 3,902,922, where the holes appear in the anode and cathode collector, respectively. When circular in configuration, these holes vary in size between about 10 microns in diameter and about 250 microns in diameter; when square, rectangular or other shape, the size of the openings is between about 78 square microns and about 65,000 square microns; and when in the form of slits, the width is at least 0.0025 centimeter and the length is up to about 1.0 centimeter. The size, number, and location of these holes is chosen so that gases formed within the battery may escape without disrupting the contact between the battery components. The holes or openings, however, are coated with a substantially continuous layer of gas-permeable, electrolyte-impermeable conductive paint, and it is recognized that the size of the holes or openings is related to the characteristics of this paint. Circular openings larger than 250 microns in diameter are unsuitable because of the tendency of the paint to shrink and crack on drying, thereby providing openings through which the electrolyte can escape. Openings smaller than 10 microns in diameter are unsuitable because particles of the conductive material in the paint may be sufficiently large to plug the holes, thereby preventing the effective venting of gases formed within the battery. Also, the minimum size of the openings is limited by the conventional perforation techniques which are used to produce the openings.

SUMMARY OF THE INVENTION

This invention utilizes a composite of a gas pervious layer and a gas impervious layer as a wrapper which regulates the species of gases that enter and/or exit from a battery, as well as the rate at which gas transmissions occur. The gas impervious layer has a fracture wide enough to permit the transmission of gases, and the width of the fracture can be maintained at a predetermined and desired size. Gases must pass through both the gas pervious layer and the fracture in the gas impervious layer.

The gas pervious layer may be on the interior and/or exterior of the gas impervious layer.

The gas impervious layer may be a thin metal foil, preferably of aluminum.

The fracture may be produced by stretching a previously made composite of the gas pervious plastic and the gas impervious layer until the latter develops cracks or fracture lines, which are controllable and which can be made in any desired length, width, and configuration. By producing fractures in such a composite, the dangers inherent in applying a wet paint to a metal which has already been perforated or slitted — the dangers of having the paint crack upon drying and/or of plugging the perforations — are avoided, and the width and area of the fracture becomes independent of rather than limited by the properties of a wet paint. Each fracture, a relatively long continuous opening rather than a plurality of small unconnected openings, provides a continuous path through which gases may pass.

Figure 1:
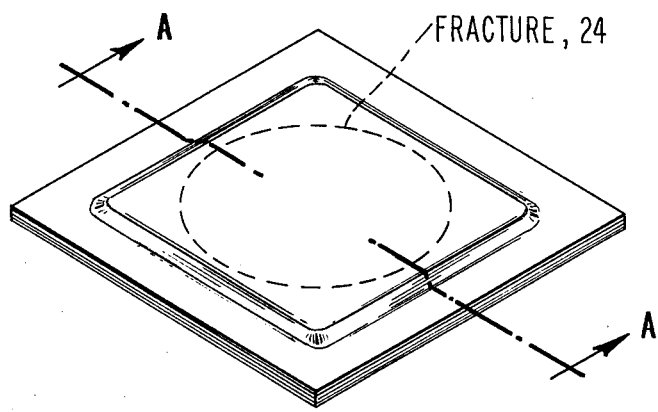
FIG. 1 is a pictorial view of the battery containing the fracture in the wrapper. The fracture is beneath the surface, and so it is shown as being hidden.

Thickness of the materials have been exaggerated in the drawings for pusposes of illustration.

Description of the Preferred Embodiments

FIG. 1 shows a dry cell battery partially enclosed by the wrapper of this invention. The gas impervious layer in that composite is fractured to permit the passage of gases, but because the gas impervious layer is beneath the surface of the wrapper the fracture is shown as being hidden.

Figure 2:
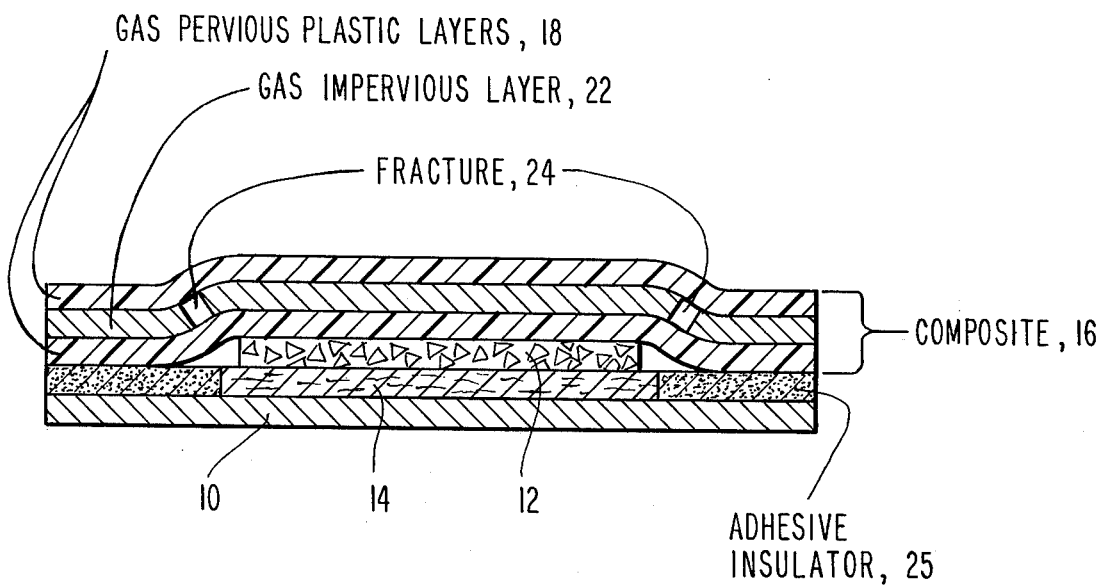
FIG. 2 is a cross-section taken along line A—A of FIG. 1.

Referring to FIG. 2 where the battery of FIG. 1 is shown in cross-section, the combination comprises a sheet metal anode 10 made from a material such as zinc, a cathode 12, and an electrolyte-containing layer 14 between the anode and cathode.

A composite 16 comprising two electrically conductive, gas pervious layers 18 and a gas impervious layer 22 such as a metal foil between the layers 18 is shown partially enclosing the battery. The layer 22 is fractured as at 24. The wrapper is sealed to the anode 10 by a deposit of electrically insulating adhesive 25 impregnated into an extension of layer 14 to complete a moisture enclosure for the battery.

To pass between the interior and the exterior of the battery shown in FIG. 2, gases must pass through the gas pervious layers 18 and the fracture 24 in the gas impervious layer 22.

Figure 3:
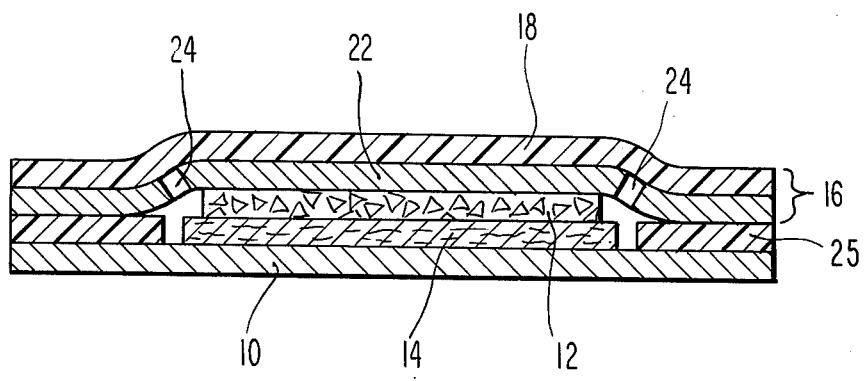
FIGS. 3 and 4 are similar to FIG. 2 but show alternative construction details internal to the battery.

Alternative construction details internal to the battery are shown in FIG. 3. In that figure the adhesive insulator 25 is separate from rather than being impregnated into an extension of the electrolyte-containing layer 14 which separates the anode 10 from the cathode 12. Only one layer of electrically conductive, gas pervious plastic 18 is used in the composite, that layer being on the outside face of the wrapper. The gas impervious layer 22 containing the fracture 24 is a metal foil placed in direct contact with the cathode 12 and made from a metal which will not produce any undesired electrochemical reactions in the battery. It will be noted from the construction shown in FIG. 3 that the composite 16 can be reversed if desired so that the metal 22 is on the outside while the plastic 18 is on the interior; by making such a reversal, metals can be used without regard for concern about undesired electrochemical reactions since they will not come into contact with the battery's electrolyte.

Figure 4:
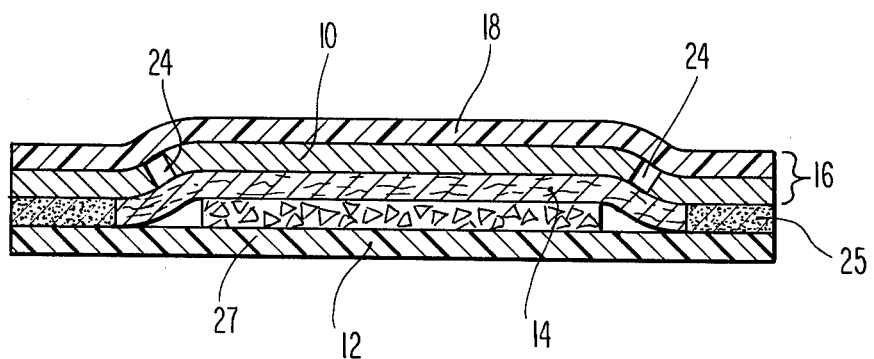

FIG. 4 shows still other alternative construction features. The anode 10 is combined with electrically conductive, gas pervious plastic layer 18 to produce the composite wrapper 16, and the fracture 24 is in the anode, which may be made from a metal such as zinc or lead. The cathode 12 is deposited on a layer of electrically conductive plastic 27, which may also be gas pervious if desired. The anode 10 is sealed with the plastic 27 around the periphery of the battery by a deposit of electrically insulating adhesive 25 impregnated into an extension of layer 14, similar to the construction shown in FIG. 2.

To function as required by this invention the layers 18 shown in FIGS. 2 through 4 must be pervious to certain gases. The layers may function by a mechanism in which the gases are dissolved and diffused in the layers. The rate at which particular gas molecules must pass through the layers, or be prevented from passing through them, should be considered taking into account the particular electrochemical system of the battery. With electrochemical systems in which an oxidizing compound is contained inside the battery, the usual desired result is to vent gases produced by discharge or overcharge from the interior to the exterior of the battery. With other electrochemical systems it may be desired to have gases transmitted from the exterior to the interior of the battery. The layer 18 must have the property of being pervious to certain gases, but they should be impervious to liquids or vapors. The gas pervious layers may be selectively pervious, i.e., permit the transmission of certain gas molecules while preventing the transmission of others, or permitting transmission of others, or permitting transmission of different molecules at different rates. A wide variety of materials including both conductive and nonconductive plastics as well as certain metals, are known and commercially available; examples of such materials are given in the references cited above.

While electrically conductive plastics are shown in the drawings, nonconductive plastics may also be used if appropriate access to the battery terminals is provided.

Although the gas impervious layer 22 in the required composite may be made from nonmetallic materials, it is preferred that the layer be a thin metal foil. In constructions such as those shown in FIGS. 2 and 3 where the metal foil is not also the anode, aluminum foils are preferred. Aluminum is commercially available in very thin foils, is relatively inexpensive, and has physical properties which lend themselves satisfactorily to this invention. Where the metal foil is also the anode as shown in FIG. 4, the foil will be the metal required by the electrochemical system of the battery, e.g., zinc, lead, etc.

The invention requires the use of a composite of a gas pervious plastic layer and a gas impervious layer which are adhesively united at their confronting faces before the fracture is produced. Such a composite may be produced by a variety of techniques including laminations between the plastic layer and a metal foil achieved through heat or with an intermediate layer of adhesive; other techniques include the use of vapor deposition, sputtering, and electrodeposition to achieve a metal layer on a surface of a plastic layer. Plastic material in a liquid or viscous state may also be deposited onto a metal foil and allowed to solidify before the fracture is made. The importance of the adhesion between the confronting faces of the two layers except at the area of the fracture is that it prevents lateral transmission of gases between the layers as shown in in U.S. Pat. No. 3,853,629, and thus the area through which the gas escapes from or enters into the battery is limited to the area of the fracture, for this reason it is essential that the gas impervious layer be less pervious to gases than the separate gas pervious layer referred to above and shown in the drawings.

Figure 5:
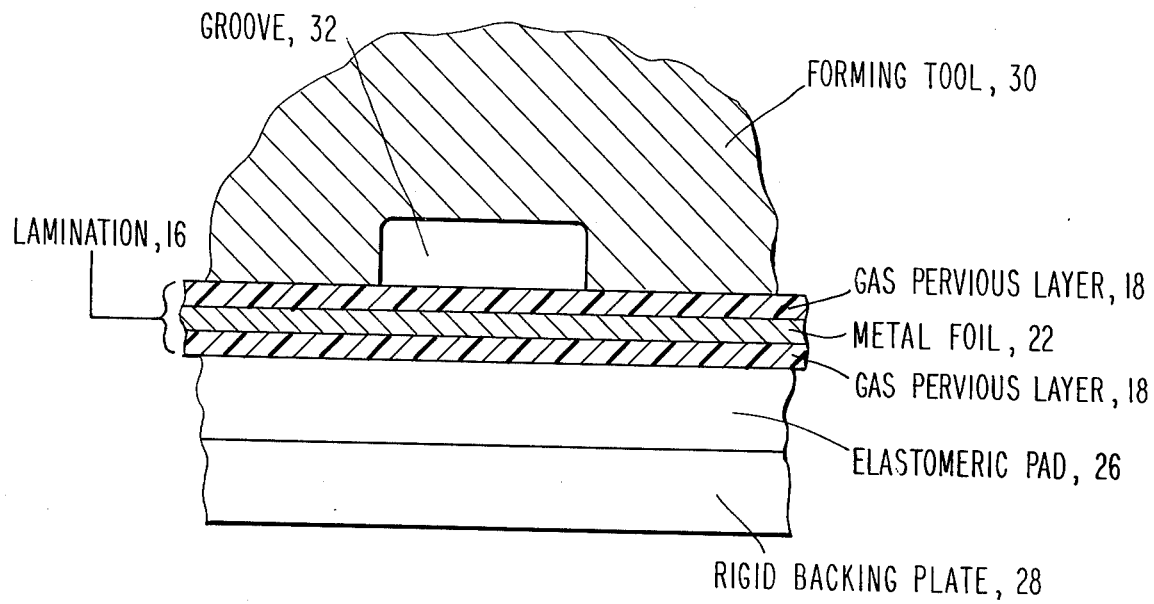
FIG. 5 is a cross-section showing the composite held between a forming tool and a support comprising an elastomeric pad and a rigid backing plate.
Figure 6:
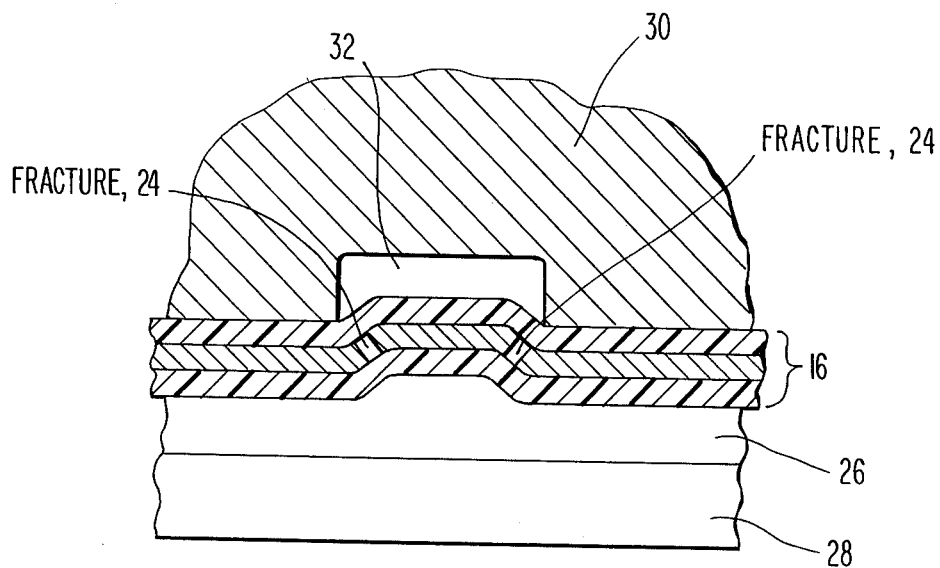
FIG. 6 shows the materials and apparatus of FIG. 5 at a later time, after the forming tool has acted against the composite to fracture the gas impervious layer.
Figure 7:
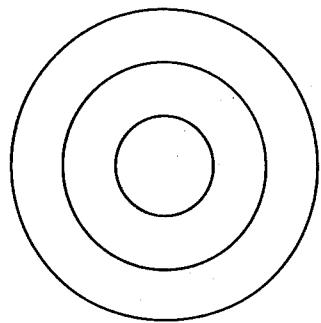
FIG. 7 (FIGS. 7A through 7D) illustrates various configurations of fractures that are possible.
Figure 7:
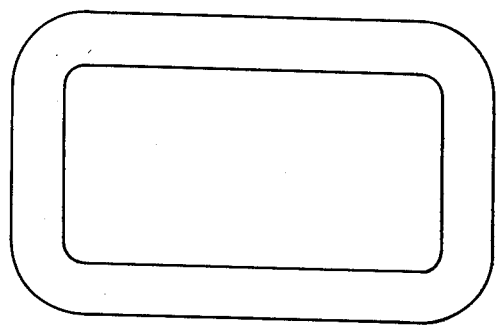
Figure 7:
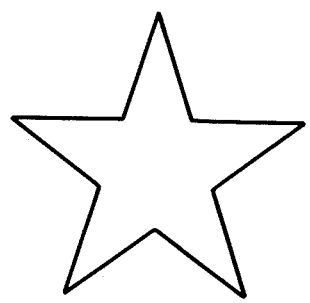
Figure 7:
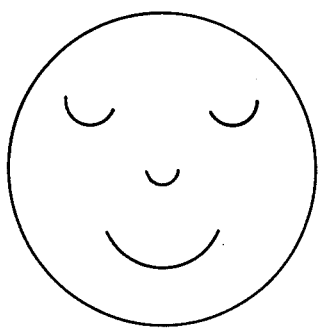
Figure 7:
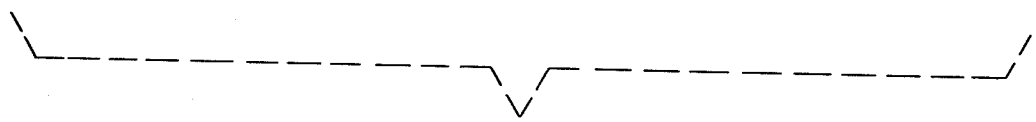

FIGS. 5 and 6 illustrate how the metal foil shown in FIG. 2 may be fractured. Referring first to FIG. 5, the composite is supported on and clamped against an elastomeric pad 26, which in turn is supported by a rigid backing plate 28. A forming tool 30 having a groove 32 therein is positioned to press downward against the composite. Referring now to FIG. 6, as the pressure is applied by the forming tool 30, the elastomeric pad 26 and the composite 16 are deflected into the groove 32. As the deflection continues the metal foil will fracture, as at 24, while the gas pervious layers continue to stretch without breaking. The width of the fracture can be determined by the amount the composite is deflected into the groove.

FIGS. 7A through 7D illustrate a few of the limitless designs that the fractures may take: concentric circles, concentric rectangles, stars, and other configurations.

The combination of the fracture width in the gas impervious layer and the properties of the gas pervious layers will determine the rate at which gases are transmitted through the wrapper. This transmission rate can be optimized only by experiment.

The composite wrapper required by this invention has several advantages. The fracture in the composite is formed without adding pieces to the assembly. The gas transmission system provided by the wrapper never ruptures or opens, and therefore it is not reqired to reseal. Unlike other sealing systems utilizing a material which may go through a phase change within the normal range of temperatures, the gas transmission rates achieved with the present wrapper will change relatively little over the normal temperature extremes. The fractures in the gas impervious layer can be formed very precisely to control the gas transmission rates, and the fractures are very reliable for that purpose. The fractures can be as narrow as 0.005 inches or less, or as wide as 0.060 inches or more. The composites can be made very thin (e.g., under 5 mils thick) and therefore add little to the thickness, weight, or volume of the battery. As previously mentioned, the composites can prevent the passage of liquids and vapors while selectively permitting the transmission of various gas molecules, and the fractures may be made in a limitless variety of configurations.

While the fractures 24 are shown in FIGS. 1 through 4 as being situated at the edge of the battery and approximately above a small void space between the cathode 12 and the peripheral seal, this is illustrative only and not an essential requirement. The fracture may be located directly above the cathode, and several fractures situated in different positions may be provided if desired.

The battery of this invention is not limited to any particular electrochemical systems or electrode and electrolyte materials, properties, or configurations.

I claim:

1. An improvement in a battery which is at least partially enclosed by a wrapper comprising a composite of
   a. a plastic layer which is pervious to gases contained within the battery, and
   b. a metal foil which is impervious to gases contained within the battery,
      wherein the improvement provides a gas-venting system for the battery, the improvement comprising a fracture in the gas impervious layer which fracture is wide enough to permit the transmission of gases between the interior and exterior of the wrapper, the plastic layer and the metal foil being adhered between their confronting faces except at the area of the fracture to prevent lateral transmission of gases between the plastic layer and the metal foil.

2. An improvement in a battery which is at least partially enclosed by a wrapper comprising a composite of
   a. two plastic layers which are pervious to gases contained within the battery, and
   b. a layer comprising a material which is impervious to gases contained within the battery, the impervious layer being between the two gas pervious layers,
      wherein the improvement provides a gas-venting system for the battery, the improvement comprising a fracture in the gas impervious layer which fracture is wide enough to permit the transmission of gases between the interior and exterior of the wrapper.

3. The improvement of claim 1 in which the gas pervious plastic layer is situated on the inside face of the wrapper.

4. The improvement of claim 1 in which the fractured gas impervious layer is situated on the inside face of the wrapper.

5. The improvement of claim 2 in which the fractured gas impervious layer is a metal foil.

6. The improvement of claim 1 in which the metal foil is aluminum.

7. The improvement of claim 6 in which the metal foil is aluminum.

8. The improvement of claim 3 in which the metal foil is aluminum.

9. The improvement of claim 4 in which the metal foil is aluminum.

* * * * *